United States Patent [19]
Bailey et al.

[11] Patent Number: 5,310,317
[45] Date of Patent: May 10, 1994

[54] QUADRA-TANG DOVETAIL BLADE

[75] Inventors: Mark J. Bailey, Cincinnati; Robert K. Mitchell, Jr., Hamilton, both of Ohio

[73] Assignee: General Electric Company, Cincinnati, Ohio

[21] Appl. No.: 928,001

[22] Filed: Aug. 11, 1992

[51] Int. Cl.$^5$ .............................................. B64C 27/48
[52] U.S. Cl. ..................................... 416/215; 416/217; 416/248; 416/219 R
[58] Field of Search ................ 416/193 A, 219 R, 248, 416/220 R, 215, 216, 217

[56] References Cited

U.S. PATENT DOCUMENTS

| | | | |
|---|---|---|---|
| 3,246,699 | 4/1966 | Jocz | 17/173 |
| 3,902,824 | 9/1975 | Sauer | 416/215 |
| 4,047,840 | 9/1977 | Ravenhall et al. | 416/135 |
| 4,466,776 | 8/1984 | Camboulives | 416/220 R |
| 5,018,941 | 5/1991 | Heurtel et al. | 416/220 R |
| 5,022,822 | 6/1991 | Sincere | 416/219 R |

FOREIGN PATENT DOCUMENTS 1476928 7/1969 Fed. Rep. of Germany ...... 416/215
2003994 3/1979 United Kingdom .

OTHER PUBLICATIONS

I. E. Treager, "Aircraft Gas Turbine Engine Technology," 1979, pp: i, ii, 469–477.

Primary Examiner—Edward K. Look
Assistant Examiner—Mark Sgantzos
Attorney, Agent, or Firm—Jerome C. Squillaro

[57] ABSTRACT

A gas turbine engine rotor blade includes an airfoil joined to a dovetail. The dovetail includes a shank from which extends two pairs of dovetail tangs being defined by a bifurcating slot disposed therebetween. The dovetail is configured for retention in a complementary dovetail groove in a rotor disk with the bifurcating slot remaining empty for reducing weight of the blade while transferring centrifugal loads from the blade to the rotor disk.

8 Claims, 3 Drawing Sheets

QUADRA-TANG DOVETAIL BLADE

The present invention relates generally to gas turbine engines, and, more specifically, to a rotor blade having a lightweight dovetail for reducing centrifugally generated loads while maintaining acceptable strength.

BACKGROUND OF THE INVENTION

A gas turbine engine such as that used for powering an aircraft includes rotor blades such as those found in a compressor thereof which are suitably fixedly joined to a rotor disk for accommodating centrifugal and aerodynamic loads generated during operation. As the rotor disk rotates during operation, the blades joined thereto are centrifuged radially outwardly, with the centrifugal loads generated thereby being suitably channeled to the rotor disk at stresses below predetermined stress limits for ensuring an effective useful life of the bladed disk combination.

More specifically, the blade includes a dovetail which is retained in a complementary dovetail groove in the perimeter of the motor disk for retaining the blade thereto during operation. The blade dovetail may either be an axial-entry type which is disposed in a complementary axially extending dovetail groove in the rotor disk, or may be a circumferential-entry type disposed in a complementary circumferentially extending groove in the perimeter of the rotor disk. In the latter case, for example, the blade dovetail has a width extending in the circumferential direction which is suitably large to provide a broad support for stabilizing the blade in the disk during operation and for obtaining acceptable stress levels therein. As the dovetail width is made larger, the stresses therein due to centrifugal force acting on the blade airfoil typically decrease, but, however, the centrifugal loads from the dovetail itself will increase which typically requires a larger disk perimeter for accommodating all of the centrifugally induced loads of the dovetail and airfoil while maintaining acceptable levels of stress therein.

The width of a circumferential entry dovetail is conventionally determined in one design as approximately equal to the rotor disk circumference divided by twice the total blade count minus twice the corner radius of the loading slot through which each of the dovetails is initially radially inserted into the rotor disk prior to being circumferentially positioned along the circumference of the dovetail groove. As the diameter of the rotor disk increases for larger engine designs relative to the number of blades used in a blade row, the resulting width of each dovetail in accordance with this conventional practice is more than that required to meet acceptable stress levels. In other words, the dovetail width becomes larger and, therefore, the shank reaction stresses therein become substantially small. However, the relatively large dovetail itself increases centrifugal loads which must be carried by the rotor disk, which, therefore, requires a larger disk to accommodate the centrifugal loads within acceptable stress limits. Accordingly, a lightweight dovetail is desired for this large diameter rotor disk application wherein the conventional dovetail width may be maintained, but with reduced weight thereof and acceptable reaction stresses therein for obtaining a useful life in a gas turbine engine application.

SUMMARY OF THE INVENTION

A gas turbine engine rotor blade includes an airfoil joined to a dovetail. The dovetail includes a shank from which extends two pairs of dovetail tangs being defined by a bifurcating slot disposed therebetween. The dovetail is configured for retention in a complementary dovetail groove in a rotor disk with the bifurcating slot remaining empty for reducing weight of the blade while transferring centrifugal loads from the blade to the rotor disk.

BRIEF DESCRIPTION OF THE DRAWING

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
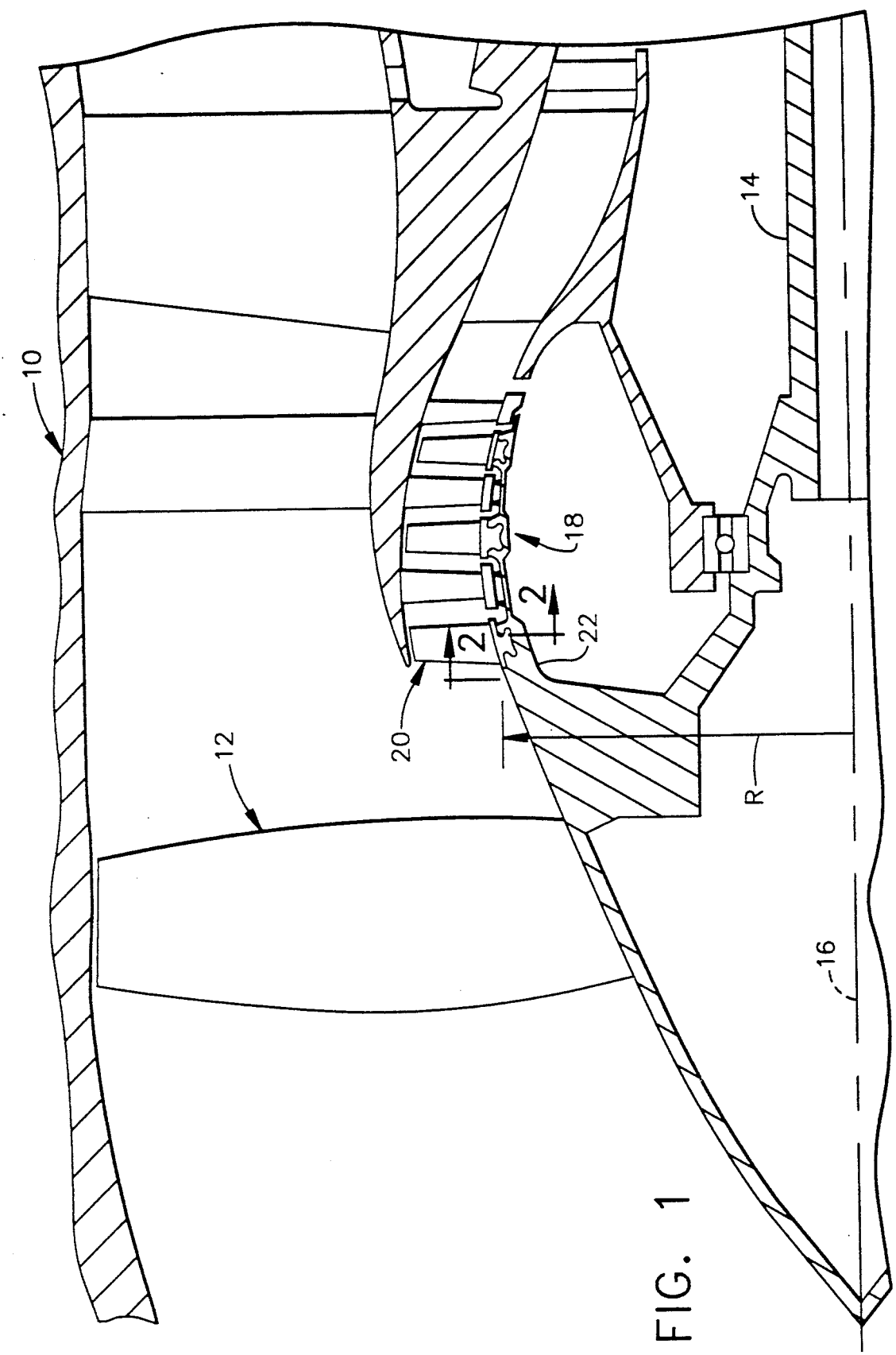
FIG. 1 is an axial, partly sectional view of a fan and compressor portion of an exemplary aircraft gas turbine engine having an improved rotor blade joined to a rotor disk therein.

Illustrated schematically in FIG. 1 is a portion of an exemplary turbofan aircraft gas turbine engine 10 including a conventional fan 12 mounted to a fan shaft 14 for rotation about a longitudinal or axial centerline axis 16 thereof. The engine 10 further includes a multi-stage low pressure compressor 18, also known as a booster compressor, which is also joined to the fan shaft 14 for rotation therewith.

Figure 2:
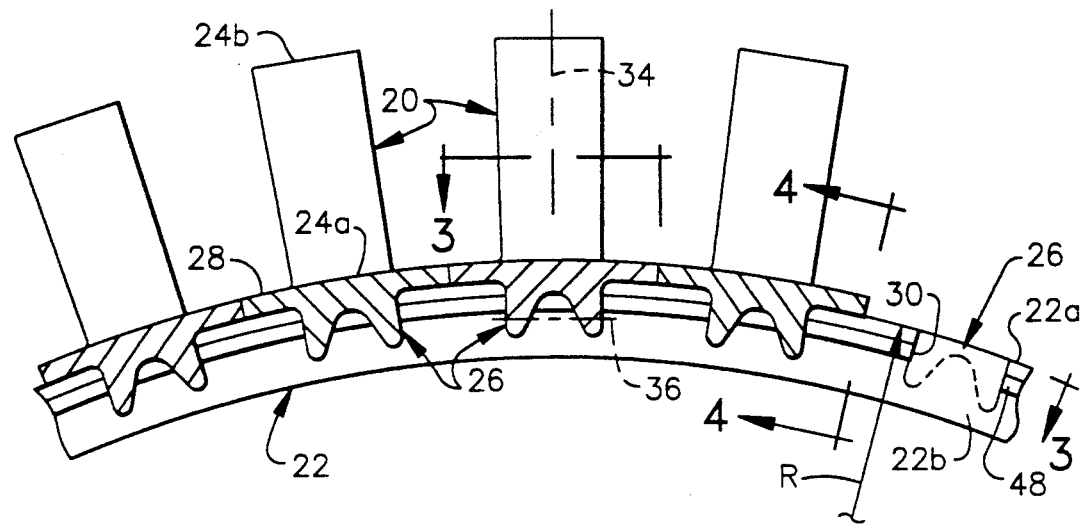
FIG. 2 is a transverse, partly sectional view of a portion of the first stage compressor blade row illustrated in FIG. 1 taken along line 2—2.

Referring to both FIGS. 1 and 2, the compressor 18 includes three exemplary blade row stages each of which includes a plurality of circumferentially spaced apart rotor blades 20 joined to an annular rotor disk 22 in accordance with one embodiment of the present invention. As shown in FIG. 2, each of the blades 20 includes a conventional airfoil 24 having a radially inner root 24a and a radially outer tip 24b. A dovetail 26 extends radially inwardly from the airfoil 24 and is fixedly joined thereto by being formed integrally with the airfoil root 24a. In the exemplary embodiment illustrated, a conventional blade platform 28, which forms a radially inner flowpath surface for the air channeled between the blades 20, is integrally formed with the blade 20 at the juncture between the airfoil root 24a and the dovetail 26.

Figure 3:
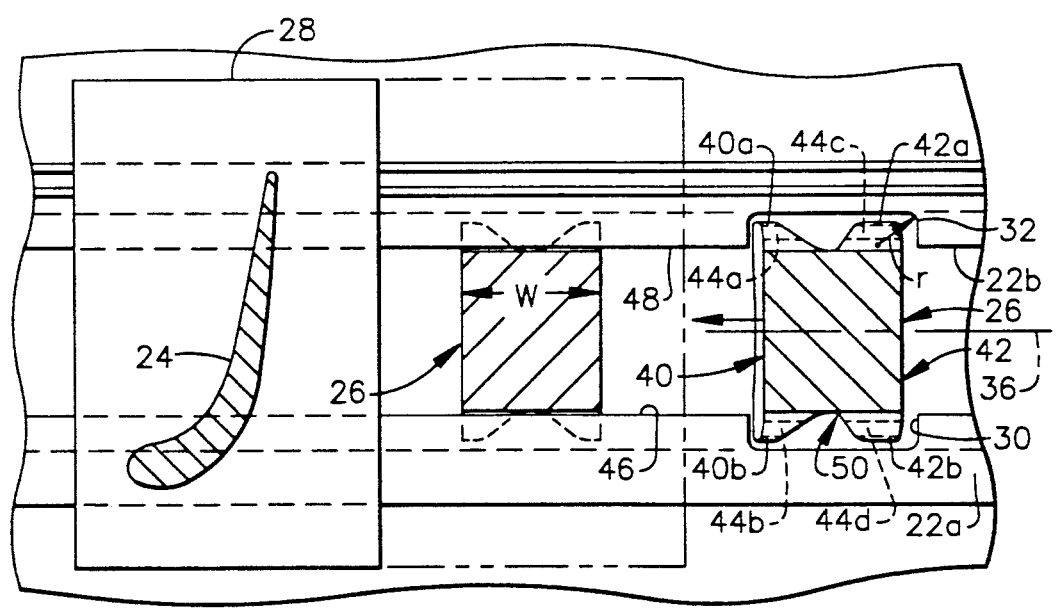
FIG. 3 is a top, partly sectional view of a portion of the blade row illustrated in FIG. 2 taken along line 3—3.

As shown in FIGS. 2 and 3, the rotor disk 22 includes a perimeter 22a at a radius R from the centerline axis 16, and a conventionally configured, circumferentially extending dovetail groove 22b which is complementary in configuration to the dovetail 26 for retaining the blade 20 to the rotor disk 22. As is conventionally known, in order to insert each of the dovetails 26 into the dovetail groove 22b, a generally rectangular loading slot 30 extends radially inwardly through the rotor disk perimeter 22a for radially receiving each of the blade dovetails 26. As shown in phantom line in FIG. 3, one of the dovetails 26 is initially positioned radially inwardly into the loading slot 30 and is then positioned circumferentially to the left in the dovetail groove 22b, with each blade 20 being in turn circumferentially positioned in the rotor disk 22 from the loading slot 30. The loading slot 30 has a generally rectangular configuration which is complementary to the outer transverse configuration of the dovetail 26 so that the dovetails 26 may be inserted into the retaining dovetail groove 22b. The loading slot 30 is therefore defined between four corners 32 each having a conventional corner radius r which typically results from the conventional machining thereof.

As shown in FIG. 2, each of the blades 20 includes a radial axis 34 extending outwardly from the centerline axis 16 (see FIG. 1), and the dovetail 26 includes a dovetail axis 36 which is disposed perpendicularly to the radial axis 34 and extends generally in the circumferential or tangential direction relative to the rotor disk 22.

In accordance with one standard practice, each of the dovetails 26 has a width W measured in the circumferential direction relative to the rotor disk 22 which is substantially equal to the circumference of the rotor disk 22, i.e. perimeter 22a, divided by twice the total, or full complement, number of blades 20 joined to the rotor disk 22 for that blade stage minus twice the corner radius r. This relationship provides a suitably long dovetail circumferential width W which provides a broad support to stabilize the blade 20 in the rotor disk 22 during operation as well as resulting in acceptable levels of stress in the dovetail 26 due to centrifugal loads. However, for a design of the compressor 18 having a large diameter relative to the total number of blades 20 therein, the dovetail circumferential width W becomes substantially large with substantially low stress therein. This in turn conventionally requires a larger rotor disk 22 for accommodating the increased centrifugal loads from the relatively large dovetails 26 in addition to those generated by the airfoils 24. A significant disadvantage will occur from using this standard practice since a heavier than required blade due to the larger dovetail 26 will result. A heavier blade requires a larger rotor disk 22 to carry the additional weight thereof which will increase specific fuel consumption (SFC) of the engine 10 therefrom which offsets the reduction in SFC due to the use of the larger diameter rotor disk 22 in the first instance.

In accordance with one embodiment of the present invention, the dovetail 26 is preferentially configured to substantially reduce its weight while maintaining the relatively large circumferential width in accordance with the standard practice, as well as providing structural rigidity for carrying the centrifugal forces generated during rotation of the blade 20 to the rotor disk 22 within acceptable levels of stress.

Figure 4:
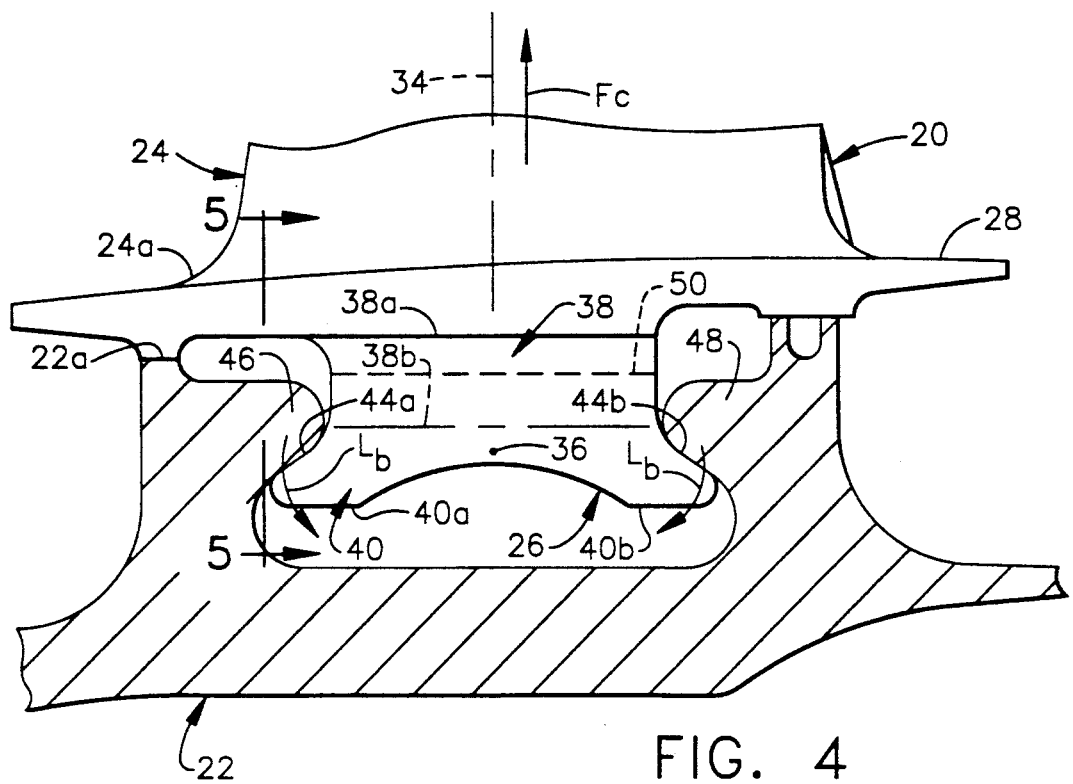
FIG. 4 is an axial, partly sectional view of one of the rotor blades illustrated in FIG. 2 joined to the rotor disk and taken along line 4—4 therein.
Figure 5:
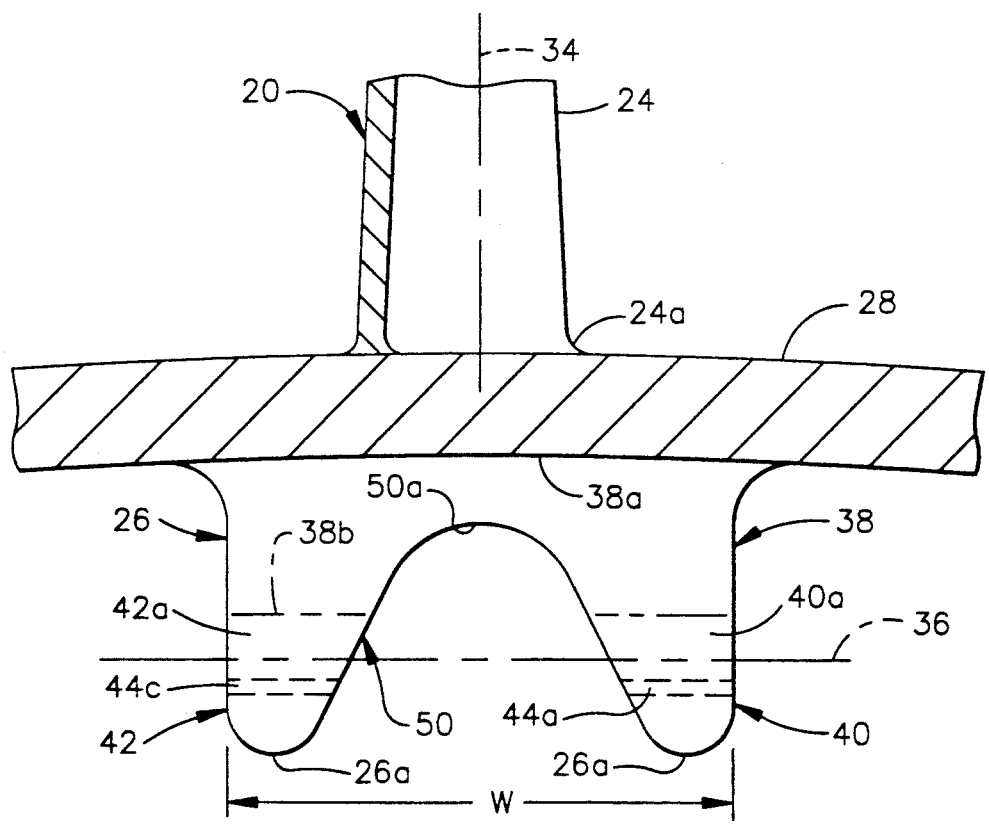
FIG. 5 is a transverse, partly sectional view of a portion of the rotor blade illustrated in FIG. 4 taken along line 5—5.

More specifically, and referring to FIGS. 4 and 5, the dovetail 26 includes a conventional, rectangular shank 38 having a top 38a fixedly joined to the airfoil root 24a at the platform 28 by being formed integrally therewith, and a bottom 38b spaced radially inwardly from the shank top 38a relative to the radial axis 34. The shank 38 also includes four sides which extend from the shank top 38a to the bottom 38b to define the rectangular shank 38. Extending radially inwardly from the shank bottom 38b and formed integrally therewith are first and second independent and discrete pairs of dovetail tangs or lobes 40 and 42, respectively. As shown in FIGS. 3 and 4, the first pair 40 includes first and second integral dovetail tangs 40a and 40b, respectively, and the second pair 42 similarly includes third and fourth integral dovetail tangs 42a and 42b, respectively, as shown in FIGS. 3 and 5.

As shown in FIGS. 3 and 4, the first and second dovetail pairs 40, 42 are coextensive with each other in the circumferential direction and are symmetrical about the dovetail axis 36 in a conventional transverse configuration. Each of the dovetail tangs 40a,b and 42a,b includes a conventional radially upwardly facing contact surface, i.e. first, second, third, and fourth contact surfaces 44a, 44b, 44c, and 44d, which abut complementary surfaces of conventional forward and aft disk tangs 46, 48 which retain the dovetail 26 to the rotor disk 22 in a conventional fashion.

Instead of having a single circumferentially extending dovetail tang pair for the full circumferential width W of the dovetail 26, the two dovetail tang pairs 40, 42 are preferred for reducing weight of the dovetail 26 while maintaining the full circumferential width W, and with a configuration effective for efficiently transferring the centrifugal force or load $F_c$ from the blade 20 into the rotor disk 22 within acceptable stress limits. The two dovetail tang pairs 40, 42 are defined by a bifurcating slot 50 as shown in FIG. 5, for example, which extends generally along the radial axis 34 and longitudinally between the dovetail tang pairs 40, 42 along the dovetail axis 36 for axially spacing apart the dovetail pairs 40, 42.

As shown in FIGS. 3 and 4, the dovetail 26 is generally conventional except for the bifurcating slot 50 which defines the dovetail tang pairs 40 and 42 which are coextensive with each other along the dovetail axis 36, with the first and third dovetail tangs 40a and 42a being coextensive with each other on one side of the dovetail axis 36, and the second and fourth dovetail tangs 40b and 42b being coextensive with each other on the opposite side of the dovetail axis 36. As shown in FIG. 3, several of the blades 20 are positioned in the rotor disk groove 22b to provide a full row of blades 20, with corresponding dovetails 26, with the respective platforms 28 thereof abutting each other in a complete annular assembly. The bifurcating slots 50 remain empty in the final bladed-disk assembly to reduce weight. The centrifugal load $F_c$ generated for each of the blades 20 during operation, is accordingly reduced due to the reduction in weight of the dovetail 26 by removal of the material in the bifurcating slot 50. Since the centrifugal loads $F_c$ are reduced, the size of the rotor disk perimeter 22a itself may also be reduced for further decreasing the overall weight of the blades 20 and the rotor disk 22. By preferentially providing the bifurcating slot 50 in accordance with the present invention, the load carrying capability of the dovetail 26 remains effective for carrying the centrifugal load $F_c$ to the rotor disk 22 within acceptable stress limits.

More specifically, and referring to FIG. 5, the bifurcating slot 50 preferably includes an arcuate base 50a extending axially between the two dovetail tang pairs 40, 42 at the dovetail shank 38, and the slot 50 preferably tapers or diverges away from the shank 38 radially inwardly therefrom and axially between the dovetail pairs 40, 42. In this way, the arcuate slot base 50a reduces stress concentrations therefrom and allows the dovetail tang pairs 40, 42 to decrease in cross-sectional area radially inwardly from the slot base 50a to the radially innermost base 26a of the dovetail 26. As shown in FIG. 5, the dovetail 26 has a constant circumferential width W preferably equal to that maximum width determined in accordance with the standard procedure described above, and each of the four dovetail tangs 40a, 40b, 42a, 42b tapers or converges in cross-sectional area from the shank 38 at the slot base 50a to the dovetail base 26a as the bifurcating slot 50 diverges. In this way, more and more material is removed from the dovetail 26 at each succeeding cross-section in the radially inward direction from the shank 38 to the dovetail base 26a for removing material without compromising the ability to carry the centrifugal load $F_c$ to the rotor disk 22 to prevent unacceptable increases in stress therein.

Each of the four dovetail tangs 40a,b and 42a,b has its respective contact surface 44a–d configured for transferring respective portions of the centrifugal load $F_c$ from the dovetail 26 to the rotor disk 22 through the forward and aft disk tangs 46 and 48. In the preferred embodiment of the invention, the bifurcating slot 50 extends transversely to the dovetail axis 36 as illustrated in FIG. 5 at least in part through the four contact surfaces 44a–d radially inwardly from the slot base 50a to the dovetail base 26a. In the preferred embodiment illustrated in FIG. 5, the bifurcating slot 50 extends completely through the four contact surfaces 44a–d to completely sever the respective colinearly aligned first and third contact surfaces 44a, 44c, and the second and fourth contact surfaces 44b and 44d as shown in FIG. 3.

Furthermore, and referring to FIG. 5 for example, each of the dovetail tangs 40a,b and 42a,b is tapered or converges in cross-sectional area additionally from the respective contact surfaces 44a–d to the dovetail base 26a.

As material is removed from the dovetail 26 by incorporating the bifurcating slot 50 itself, the material remaining for carrying the centrifugal load $F_c$ decreases, which necessarily increases stress levels therein. However, by preferentially configuring the bifurcating slot 50 as above described, a substantial amount of material may be removed from the dovetail 26 for reducing its weight without increasing the stress levels therein past conventional stress limits. Since the shank 38 is relatively wide having the circumferential width W, it has a relatively large cross-sectional area through which the centrifugal force $F_c$ is carried to the four dovetail tangs 40a,b and 42a,b. By having the bifurcating slot 50 commencing within the shank 38, for example at a suitable radial position above the shank bottom 38b transitional load carrying areas are created at the relatively large, or maximum, cross-sectional area of the two dovetail tang pairs 40, 42 where they join the shank 38. The contact surfaces 44a–d are disposed adjacent to the shank bottom 38b as well as adjacent to the slot base 50a so that respective portions of the centrifugal load $F_c$ are carried thereto within acceptable stress limits.

In this regard, FIG. 4 illustrates schematically the direction of reaction bending loads $L_b$ imposed upon the respective dovetail tang pairs 40, 42 by the respective forward and aft disk tangs 46, 48. The dovetail tang pairs 40, 42 must accommodate these bending loads $L_b$ as well as shear loads in the radial direction within acceptable stress limits. Since each of the dovetail tang pairs 40, 42 is itself substantially conventional in configuration each provides suitable load carrying capability for carrying the bending loads $L_b$ and corresponding shear loads therethrough. However, since the dovetail 26 is symmetrical along the dovetail axis 36, unnecessary portions thereof may be removed by introducing the bifurcating slot 50 without compromising the load carrying capability of the dovetail 26.

Referring again to FIG. 5, each of the dovetail tangs 40a,b and 42a,b is additionally tapered from the respective contact surfaces 44a–d to the dovetail base 26a as above described to yet further reduce the overall weight of the dovetail 26 without compromising load carrying capability thereof. This tapering of the dovetail tangs allows material to remain radially below each of the contact surfaces 44a–d to suitably carry shear loads therein, with the bending loads $L_b$ being carried primarily by the material between the respective dovetail tangs of each pair, i.e. 40a and 40b, and 42a and 42b.

With the plurality of rotor blades 20 having the improved dovetails 26 in accordance with the invention disposed in combination with the rotor disk 22, not only can the overall weight of the blades 20 be reduced, but also the overall weight of the blades 20 in combination with the rotor disk 22. The bifurcating slot 50 reduces the weight of the dovetail 26 which reduces the centrifugal loads which must be carried by the rotor disk 22, and therefore, allows the rotor disk 22 to be designed thinner and lighter than it ordinarily would without the bifurcating slots 50 at the same dovetail circumferential width W. Since the bifurcating slot 50 remains empty during rotation of the rotor disk 22, the reduction in weight of the rotor disk 22 may be realized without stresses exceeding conventional limits in either the rotor disk 22 or the dovetails 26 themselves.

Although in the preferred embodiment of the invention, the circumferential width W of the dovetail 26 is provided in accordance with the standard procedure presented above which results in a relatively wide, generally low stress dovetail 26, the invention may be applied to other similar dovetails 26 having reduced circumferential widths W. The bifurcating slot 50 may be introduced in any similar dovetail 26 providing that the stresses within the dovetail 26 do not exceed conventionally established limits for obtaining useful lifetimes of of the dovetail 26. As the load carrying area of the dovetail 26 decreases upon decreasing the circumferential width W, for example, the extent of the bifurcating slot 50 radially upwardly into the shank 38 may be correspondingly decreased to ensure that acceptable load carrying cross-sectional area of the dovetail 26 remains for operation within acceptable stress limits.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A rotor blade adapted to be positioned radially in a gas turbine engine comprising:
   an airfoil having a root and a tip; and a dovetail extending from said airfoil and including:
   a shank having a top fixedly joined to said airfoil root, and a bottom spaced from said shank top;
   first and second pairs of dovetail tangs extending radially inwardly from said shank bottom, said first pair including first and second integral dovetail tangs, and said second pair including third and fourth integral dovetail tangs, said dovetail tang pairs being symmetrical about a dovetail axis and being defined by a bifurcating slot disposed therebetween for spacing apart said dovetail pairs, said first and third dovetail tangs being coextensive on one side of said dovetail axis, and said second and fourth dovetail tangs being coextensive on an opposite side of said dovetail axis; and said dovetail being configured for retention in a complementary dovetail groove in a rotor disk with said bifurcating slot remaining empty for reducing weight of said blade while carrying centrifugal load from said blade to said rotor disk.

2. A rotor blade according to claim 1 wherein said slot diverges from said shank and between said dovetail pairs.

3. A rotor blade according to claim 2 wherein each of said first, second, third and fourth dovetail tangs has a contact surface configured for carrying said centrifugal load from said dovetail to said rotor disk, and said slot extends transversely to said dovetail axis at least in part through said contact surfaces and to a base of said dovetail.

4. A rotor blade according to claim 3 wherein said bifurcating slot extends completely through said contact surfaces.

5. A rotor blade according to claim 4 wherein said dovetail has a constant width and each of said dovetail tangs converges from said shank to said dovetail base as said bifurcating slot diverges.

6. A rotor blade according to claim 5 wherein each of said dovetail tangs is tapered from said contact surfaces to said dovetail base.

7. A rotor blade according to claim 5 in combination with said rotor disk, and wherein:

said dovetail groove extends circumferentially around said rotor disk perimeter;

said dovetail is a circumferential-entry dovetail disposed in said circumferential dovetail groove for retention therein; and said bifurcating slot is empty for reducing weight and centrifugal loads carried by said rotor disk due to said blade.

8. A rotor blade and disk combination according to claim 7 wherein said rotor disk has a perimeter and a loading slot extending therethrough for radially receiving said dovetail for positioning circumferentially in said dovetail groove, said loading slot being defined between four corners each having a radius, and said dovetail width extends circumferentially and is substantially equal to the circumference of said rotor disk perimeter divided by twice the total number of said blades in said rotor disk minus twice said corner radius.

* * * * *